US009007444B2

(12) United States Patent
Panas et al.

(10) Patent No.: US 9,007,444 B2
(45) Date of Patent: Apr. 14, 2015

(54) ARRAY DIRECTED LIGHT-FIELD DISPLAY FOR AUTOSTEREOSCOPIC VIEWING

(75) Inventors: Robert Matthew Panas, Cambridge, MA (US); Jonathan B. Hopkins, Palto Alto, CA (US)

(73) Assignee: Massachusetts Institute of Technology, Cambridge, MA (US)

( * ) Notice: Subject to any disclaimer, the term of this patent is extended or adjusted under 35 U.S.C. 154(b) by 629 days.

(21) Appl. No.: 13/191,528

(22) Filed: Jul. 27, 2011

(65) Prior Publication Data

US 2012/0194508 A1 Aug. 2, 2012

Related U.S. Application Data

(60) Provisional application No. 61/390,702, filed on Oct. 7, 2010.

(51) Int. Cl.
*H04N 13/04* (2006.01)
*G02B 27/22* (2006.01)

(52) U.S. Cl.
CPC ....... *H04N 13/0459* (2013.01); *H04N 13/0468* (2013.01); *H04N 13/0484* (2013.01); *H04N 13/0404* (2013.01); *G02B 27/225* (2013.01); *H04N 13/042* (2013.01); *H04N 13/0427* (2013.01); *H04N 13/047* (2013.01)

(58) Field of Classification Search
USPC ........................................ 348/42, 51, 54, 59
See application file for complete search history.

(56) References Cited

U.S. PATENT DOCUMENTS

| 5,319,387 | A | * | 6/1994 | Yoshikawa | .................... 345/179 |
| 5,585,960 | A | | 12/1996 | Sato et al. | |
| 6,259,450 | B1 | | 7/2001 | Chiabrera et al. | |
| 7,705,876 | B2 | * | 4/2010 | Starkweather et al. | ......... 348/51 |
| 2003/0128175 | A1 | | 7/2003 | Berstis | |
| 2004/0252187 | A1 | | 12/2004 | Alden | |
| 2008/0049291 | A1 | | 2/2008 | Baek et al. | |

FOREIGN PATENT DOCUMENTS

WO 2004/111913 A2 12/2004

OTHER PUBLICATIONS

International Search Report and Written Opinion issued in connection with International Patent Application No. PCT/US11/47399 mailed on Sep. 26, 2011.

(Continued)

*Primary Examiner* — Geepy Pe
(74) *Attorney, Agent, or Firm* — Sam Pasterneck; MIT Technology Licensing Office

(57) ABSTRACT

Autostereoscopic display. The display includes an array of elements from which light emanates, the elements being rotatable about two orthogonal axes by microcontrollers. An eye tracker is provided for determining the location in three dimensions of at least one eye viewing the array. The microcontrollers, using information from the eye tracker, rotate the elements to mimic a concave surface to deliver light to the eye. It is preferred that the elements are mirrors and the display further includes a projector for projecting an image on the array for reflection to the eye. The elements themselves may include structure for generating light rather than reflecting light.

9 Claims, 2 Drawing Sheets

(56) References Cited

OTHER PUBLICATIONS

Jun Yan, Stephen T. Kowel, Hyoung J. Cho, Chong H. Ahn, Gregory P. Nordin, and Jeffrey H. Kulick, "Autostereoscopic three-dimensional display based on a micromirror array", Applied Optics, vol. 43, No. 18, Jun. 20, 2004.

International Report on Patentability PCT/US2011/047399 mailed on Apr. 18, 2013.

* cited by examiner

ARRAY DIRECTED LIGHT-FIELD DISPLAY FOR AUTOSTEREOSCOPIC VIEWING

This application claims priority to U.S. provisional application Ser. No. 61/390,702 filed on Oct. 7, 2010, the contents of which are incorporated herein by reference.

BACKGROUND OF THE INVENTION

This invention relates to three-dimensional displays and more particularly to a display for autostereoscopic viewing.

A range of display technologies currently exists to produce near 3-D images. Stereoscopic displays are the most common at present. Stereoscopic displays utilize glasses that must be worn to generate the stereoscopic image and the image viewpoint is unalterable. Several forms of this technology exist including anaglyphic, polarization, or alternate-frame 3-D displays. The differences are found in the types of glasses used to separate the images to each eye.

Autostereoscopic displays produce 3-D images without specialized glasses but they are not without limitations. Parallax based autostereoscopic display technologies require the viewer to be seated at particular locations in order to produce the stereoscopic effect which limits the number and orientation of viewers. Lenticular lens based autostereoscopic displays suffer from reduced resolution. Present autostereoscopic display technologies are able only to produce horizontal parallax for multiple viewers, not vertical parallax. Vertical parallax can be accomplished only for a single viewer using eye tracking. The image is altered to produce the vertical parallax for the single viewer based on a known eye location. The result is a distorted image for all other viewers.

SUMMARY OF THE INVENTION

According to the invention, the autostereoscopic display includes an array of elements from which light emanates, the elements being rotatable about two orthogonal axes by microcontrollers. An eye tracker determines the location in three dimensions of at least one eye viewing the array. The microcontrollers, using information from the eye tracker, rotate the elements to mimic a concave surface to deliver light to the eye. In a preferred embodiment, the elements are mirrors and the display further includes a projector for projecting an image onto the array for reflection to an eye. In another embodiment, the elements themselves include means for generating light. The means for generating light may include a laser or light emitting diode along with a lens for directing the light to the eye. It is preferred that the eye tracker include two eye-locating cameras.

In yet another preferred embodiment, the elements are anchored to a support structure with flexures. It is also preferred that the elements be rotated by electrostatic actuators. Separate images are delivered to eyes of different viewers and separate images are delivered sequentially to the left and right eyes of a single viewer. It is preferred that the elements in the array are in the size range of approximately 0.2 mm to 10 mm.

The invention disclosed herein has several advantages over other stereoscopic displays. Compared with existing technologies that use large rotating mirrors, the present invention produces less sound during operation, reduces the hazard associated with operation, requires only a thin planar operating volume rather than a large cylindrical volume, has a higher bandwidth, reduces visual motion blur due to smaller absolute motions, and has greater flexibility in the sequence and direction of the image projected. Specular (reflective) mirrors rather than selectively diffusive mirrors are preferred in the present design. The use of specular mirrors simplifies the fabrication of the display. The display requires the use of only a single projector which reduces the cost and complexity of the electrical/optical components in the system. Finally, the display can be used in reverse to capture images. The projector is replaced with a high speed camera and the scanning of the array provides different images to the camera corresponding to the optical flux at different angles.

DESCRIPTION OF THE PREFERRED EMBODIMENT

Figure 1:
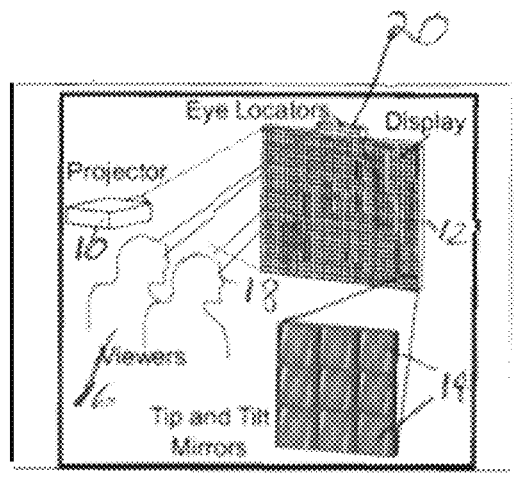
FIG. 1 is a perspective, schematic view of the overall concept underlying the present invention.

The array directed light-field display system disclosed herein is composed of several components. With reference to FIG. 1, a projector 10 is used to rapidly project images onto an array 12 of mirrors 14—referred to as the ADL display. The mirrors 14 in the array 12 are independently controlled in tip and tilt by microprocessors to mimic a concave surface. The curvature of the surface is such that the image projected onto the screen is reflected back into one of the eyes of the viewer 16. The mirror curvature is altered at a high rate to sequentially project images to each eye 18 of each viewer 16. Eye locating cameras 20 on the display screen locate the eyes of the viewers. These cameras 20 identify where the display must focus the image.

The two eye locating cameras 20 will locate all of the eyes in the room several times a second and feed this information to microcontrollers driving the mirror array. The cameras will also locate the projector and feed this information to the microcontrollers. The microcontrollers use this information to determine the required tip and tilt for each mirror. Calculating the required angles is a linear matrix type calculation which can be carried out using little computing power.

The mirrors are then driven using feedforward algorithms to rapidly step and settle to the correct orientation. Once the mirrors have settled, the projector casts the desired image onto the array of mirrors.

This image is calculated in one of three ways, depending on the material being viewed. In the multiperspective 3D method, rendering software uses the known location of the viewer's eyes to calculate the correct perspective image. Should the viewer move, the perspective is changed and the software alters the image that is projected to each eye. The viewing experience in this mode is equivalent to actually having the object sitting in front of the viewers; it will be the mode generally used in gaming and eventually in viewing 3D videos. In the monoperspective 3D method, an image is generated based off of a set perspective location which is unrelated to the viewer's location. This method sends the same perspective images to each viewer, as is found in commercially available glasses-based 3D displays. This mode is equivalent to having all of the viewers sharing the exact same location when looking upon a 3D scene; it will be the mode initially used for viewing 3D videos, as it only requires the capture of 2 images per frame. In the 2D method, the same perspective is projected to every eye of every viewer, resulting in an image without the $3^{rd}$ viewing dimension: depth. This method allows the ADL display to be backwards compatible with existing 2D video.

Figure 2:
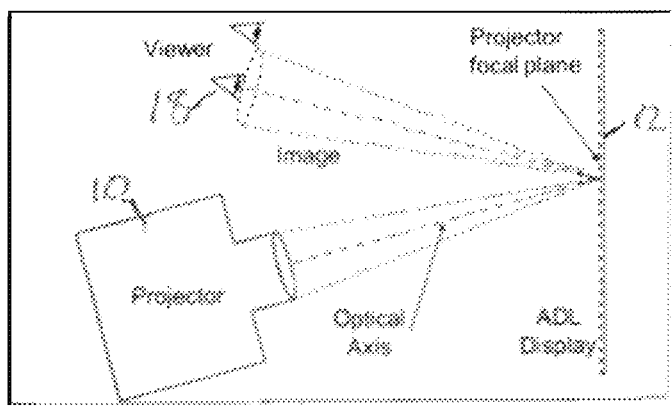
FIG. 2 is a schematic illustration of ray tracing of pixel focus on the mirror array.

The projector 10 is focused so that the image plane is the same as the mirror plane. The focused light for each point may be visualized as a cone extending from the projector lens to each point on the image plane/mirror array. See FIG. 2.

The light is reflected by the mirror towards the viewer's eye. This reflected light may be visualized as a cone starting as a point on the mirror array and spreading to a circular cross section centered on the viewer's eye. The radius of this cone will be equivalent to the radius of the projector lens, assuming the viewer sits at the same distance from the ADL display as the projector. This area corresponds to all locations from which the pixel will be seen. The image is therefore visible from a small volume of locations, rather than precisely at the location of the eye. This slightly eases the requirements on the eye locating and mirror alignment. Slight misalignments or vibration of the mirrors will therefore not significantly distort the image captured by the eye. Vibrations in the mirrors will make the pixels appear to oscillate up and down on the screen. The millimeter scale of the screen is small enough that each mirror is nearly the size of a single pixel. This means that a single color may be projected onto each mirror, corresponding to that pixel. There will now be no effect on the image in the single pixel case, should the mirror vibrate or be misaligned, as the pixel is uniformly illuminated. This significantly lowers the performance requirements for the mirror.

Figure 3:
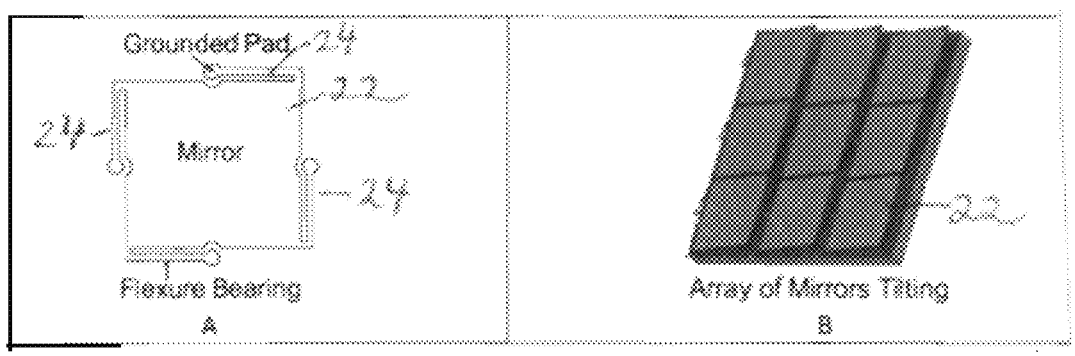
FIGS. 3a and 3b are schematic illustrations showing the structure of the mirror and flexural bearings.

With reference to FIGS. 3a and 3b, the mirror array 12 will be composed of a square grid of 1×1 mm mirrors 22, each roughly 10 um thick. These mirrors 22 will be composed of a polymer core with a reflective coating on the surface. These mirrors will have 4 flexures 24 anchoring them to the main display structure. Each of the flexures 24 will be located on one side of the square mirror. The flexures 24 will allow the mirror 22 to tip and tilt as well as move out of plane. Each of the possible motions will have an inherent stiffness associated with it, due to the elasticity of the flexures. The rotational stiffness will be roughly 300 nNm/rad. The moment of inertia of the polymer mirror about both rotational axes will be roughly $10^{-15}$ kgm².

Figure 4:
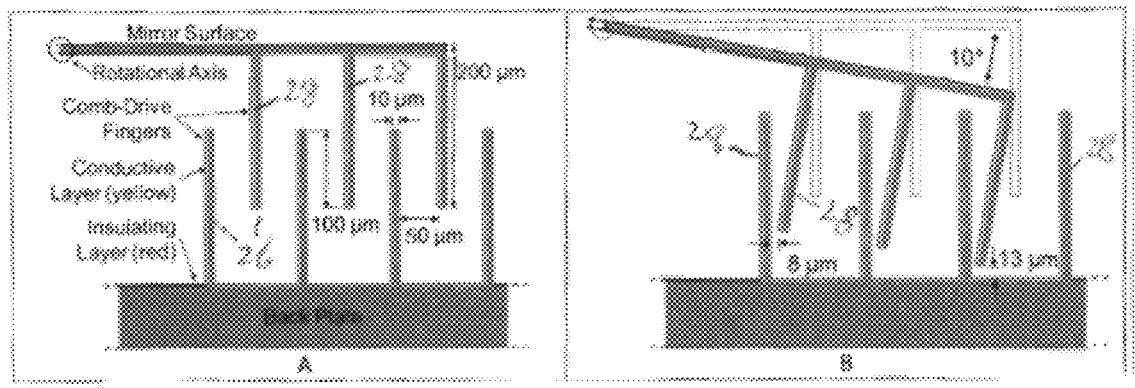
FIG. 4a is a side view of a comb drive-based electrostatic actuator showing comb fingers on both the mirror back and the base plate.
FIG. 4b is a side view of the actuator illustrating alignment issues encountered during large deflection tipping of the mirror array.

With reference to FIGS. 4a and 4b, four comb-drive electrostatic actuators 26 are located on the backside of each mirror 22. These actuators 26 work on the principles of electrostatic attraction and repulsion. The actuator pads are composed of ridges, or comb 'fingers' 28 which are coated with two layers—a conductive layer underneath and an insulating layer on top. This allows the surface of the ridged pads to be charged, but the charge cannot be lost if the ridges come in contact with another conductor since an insulator covers the conductive layer. The fingers 28 are 200 um tall, 10 um wide 1 mm long and separated by a 110 um gap. Three sets of ridges will be used for each actuator pad on the mirror array 12. The corresponding pad on the backplate will have 4 fingers aligned as shown below. The fingers will overlap by roughly 100 um once assembled. This is slightly larger than the 87 um of rise and fall seen at the edges of the mirror plate due to full 10° tilting. The gap between fingers will be 50 um once the two parts are aligned relative to one another. The 10° tilt causes the furthest tip of the moving comb fingers 28 to reduce the 50 um gap down to 8 um.

Figure 5:
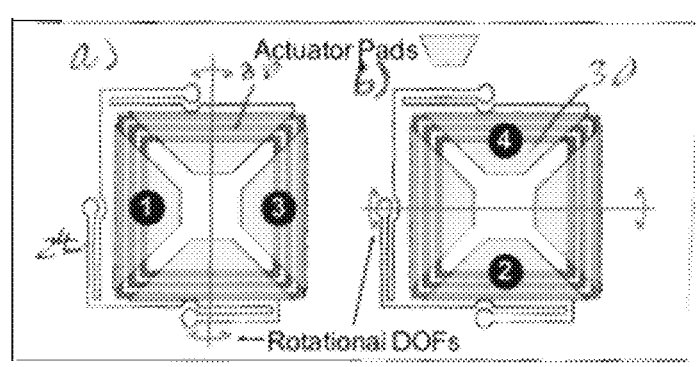
FIGS. 5a and 5b are schematic illustrations of actuator layout on the back of the mirror plate.

The actuator pads 30 shown in FIGS. 5a and 5b are linked with thin metal traces to drive circuitry on the back of the display. This circuitry applies voltages to the pads to build up controlled amounts of charge on the pads. The charge on the pad is read and maintained with a charge amplifier, enabling charge based control of the actuator. This avoids issues with pull-in and increases the range of the actuator. Two actuator pads are able to drive each degree of freedom, given their alignment relative to the axes of rotation.

During operation, the actuators 26 are driven using digital commands from an FPGA located at the back of the display. This controller sends out a series of binary commands which are used to apply a set amount of positive or negative charge to the actuator pads on the base plate. A constant negative charge is kept on the pads on the mirror. If a positive charge is placed on the lower pads, then the actuator produces an attractive force, pulling one side of the mirror down. If a negative charge is placed on the lower pads, then a repulsive force is generated, pushing that side of the mirror up. By varying the relative frequency of positive to negative commands, any value between full positive and full negative can be commanded. The switching frequency will be roughly 20× higher than the operation of the device, about 100 khz. This enables any actuation force to be generated with only simple binary commands.

The two actuators for each axis will be driven up to roughly 100 V of charge, corresponding to 0.2 nC on each pad at 0° deflection. The magnitude of charge is maintained by the charge amplifiers. By varying the lower plate between +0.2 nC and −0.2 nC of charge, attractive and repulsive forces of 90 uN will be generated by each actuator. The two actuators together will produce a torque of 90 nNm, which is sufficient to drive the micromirror at about 4 kHz for 10° amplitude oscillations. In practice, the motion of the device will generally be far less than this, as the viewers eyes are very close together. This means the mirrors will be able to operate at least at 4 kHz.

The bandwidth requirements on the mirrors are determined by the frame rate of the video as well as the number of viewers. The projector must align and transmit one image to each eye of each viewer for each frame of the video. Therefore, the required bandwidth is twice the product of the number of viewers and the frame rate of the video. As an example, a family of 4 watching a video at 30 Hz would require 240 Hz mirror bandwidth. The estimated lower bound of 4 kHz bandwidth of the mirrors will be capable of providing 30 Hz 3D video for more than 66 people simultaneously.

Figure 6:
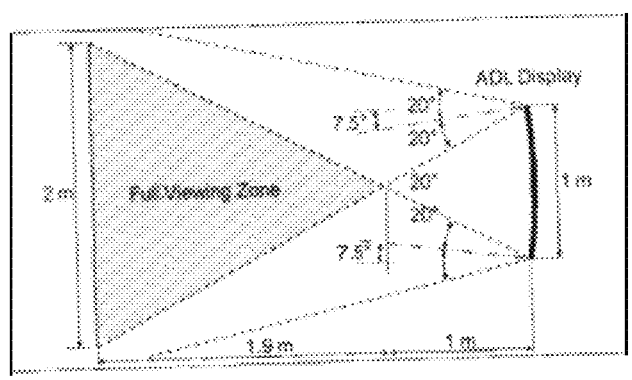
FIG. 6 is a top view of the display disclosed herein showing the available viewing area given a 10 degree maximum rotation of the mirrors in the array.

The whole mirror array will not be a flat panel, but rather a slightly curved surface, adjusted so that the edges of the screen are slightly tilted inwards. For a 1 m wide screen, this max edge tilt will be 7.5°, which will give a triangular viewing area that starts 1 m from the display and has a 27.5° angle with the plane of symmetry. At the optimal viewing distance of 1.7 to 2.9 m, which is typical for 1 m displays, the viewing area is nearly 2 m wide as shown in FIG. 6.

The electronics controlling the mirror array will be located on PCBs behind the mirror array. Sections of the mirror array will be controlled in bulk to reduce processing load. This means small areas of the display will be given the same signal, controlling all the mirrors to produce the same orientation. Patches of roughly 10×10 mirrors, 1 cm² will be controlled in bulk. For each of these sets, four signals will be required, one for each of the four actuators on the mirrors. These signals will be generated by an FPGA which has stored the calibration values for the bulk mirror region. FPGAs with large numbers of I/O pins (≈600) will be used to simultaneously control 100 bulk mirror regions. This corresponds to a 10×10 cm segment of the screen controlled by a single FPGA. These microchips may be purchased for a few dollars each in bulk. 100 FPGAs will be needed to control a 1×1 m display. The FPGAs will communicate with a main processor which reads in the eye locations and synchronizes the mirror motions with the image projection.

The projector will be a TI DMD based device, due to the high bandwidth of the DLP technology. DLP enabled projectors are able to refresh at up to 32 kHz. Color images will be obtained by using a 3 chip design. Each color is handled by a single DLP chip in this design, then recombined using prisms to form the full color image. The projected image will be synchronized with the motion of the mirrors. This synchronization will ensure that when the image is cast on the mirrors, the mirrors are already aligned to reflect the image towards the viewer's eye.

The light reflected by the mirrors will naturally spread due to the conical focusing of the projector light as described previously. The spread of the reflected light places design bounds on the projector lens. Assuming the projector and viewer are roughly equally distant from the display, then the lens must be between roughly 2 mm and 12 cm in diameter for two reasons: illumination and visual overlap. The lower limit on the lens diameter ensures that the light spreads sufficiently for the viewer to be able to see the entire image projected onto each discrete flat mirror. The upper limit on the lens size ensures that the light does not spread so much that both eyes can see the image projected to only a single eye. A standard 3-4 cm lens will be used in the ADL projector.

The eye locator device is composed of two cameras, placed on either side of the display. These cameras will face the viewers. A facial identification algorithm will analyze the images from each camera in order to locate all of the faces found in the viewing area of the display. The eyes in each of the faces will be identified and their angular direction from the camera will be calculated. A 3D map will be formed containing the known location of the cameras and vectors emanating from the cameras in the measured direction of the eyes. The viewer's eyes are located at the intersection of the pointing vectors from the two cameras. This will be done at roughly 10 Hz, enabling the eye locator to track all of the eyes in the room in real time. The location of the eyes as determined by the previous calculation will form an estimate for the next calculation, reducing the calculation load on the eye locator. A calibration mode will be accessible in the TV for determining that what the system is tracking are truly eyes. The screen will show the 3D image generated by the two eye locator cameras and allow the viewers to control which objects the system tracks as eyes.

The device will be manufactured in several steps. The mirror array fabrication will be described first. The mirror arrays will be fabricated in roughly 10 cm×10 cm plates, which are arrayed together to form the desired screen size.

The first step will be to place a roughly 300 um (0.012") sheet of polymer onto a steel backing plate. This steel backing plate provides a means of rigidifying the structure during the fabrication and assembly steps.

The second step will be to hot emboss the polymer to form the ridged actuator structure on the bottom of the mirrors. The hot embossing process will be carried out as follows. The shaped tool will be pressed against the polymer sheet at room temperature, providing a preload compressing the polymer against the steel plate. Both the steel plate and the tool will then be heated above the polymer's glass transition temperature, causing the polymer to become moldable. The tool will then be pressed into the polymer in order to generate the required surface features. During this step the polymer is held in place by the pressure of the tool compress the polymer into the steel backing plate. The tool and steel plate will both be cooled to below the polymer's glass transition temperature. The tool will be retracted, pulling the molded polymer away from the steel backing plate. The molded polymer is stuck to the tool during this step. A thin layer of thermally removable wax adhesive will be placed over the surface of the steel backing plate. The steel backing plate will be heated to the point of melting the wax adhesive, ensuring a thin liquid layer uniformly covering the steel backing plate surface. The molded polymer will then be pressed back against the steel backing plate, while the wax adhesive is in liquid state. The liquid adhesive will be allowed to cool, adhering the polymer to the steel backing plate. The tool will be retracted from the polymer, leaving the shaped features behind.

The third step will be laser cut the solidified polymer structure to generate the flexures. A large (1 cm) laser beam diameter will be used to do the cutting at high rate. An optical mask will be placed above the polymer, aligned so as to allow the laser light through in the desired locations for cutting the polymer. The large diameter beam is then swept over the 10×10 cm surface, cutting through the 10-100 um thick polymer and generating all of the mirror/flexure features in only a few seconds. This results in an array of polymer 'mirror' structures adhered to the steel backing plate.

The fourth step will be to deposit metal traces over the actuator structures. This will be done using RF sputter deposition of a metal, such as gold. A shadowmask will be placed above the polymer sheet. The anisotropic deposition of metal atoms will be controlled by the gaps in the shadowmask to leave metal only on the actuator pads and as traces from the pads down the flexures.

The fifth step will be to deposit an insulating dielectric over the actuator structures. This will be done using RF sputter deposition of a dielectric, such as silicon dioxide. A shadowmask will be used to limit the deposition to only cover the mirror back and actuator pads with an insulating layer. The traces located along the flexures will be hidden by the shadowmask, and thus not covered by the insulating layer.

The sixth step is to electroplate the exposed traces with a flexural metal such as steel to produce metal flexures which have a polymer core. These bearings will not suffer from the creep and fatigue typical of polymer flexures.

This completes the fabrication of the mirror array.

The polymer backplate provides anchoring standoffs to hold the mirror array in the correct location. It also has actuator pads patterned onto its surface to interact with the pads on the mirror array. Finally, it has vias to connect the actuator traces with PCB electronics on the backside of the polymer backplate.

The first step will be to adhere a thick, roughly 2-4 mm sheet of polymer to a steel backing using a wax adhesive as described earlier. These will be roughly 10×10 cm.

The second step will be to hot emboss the ridged actuator structures onto the surface of the polymer backplate, as described earlier. Standoffs of roughly 150 um height will also be embossed into the surface to serve as mounting points for the mirror array.

The third step will be to laser cut vias through the polymer backplate using the same combination of wide diameter laser beam and optical mask described earlier. These vias will allow the traces on the front of the plate to be connected to electronics on the back.

The fourth step will be to deposit metal traces over the ridged actuator structures. This will be done using electron-beam deposition of a metal such as gold, controlled with a shadowmask as described earlier. This will leave traces plated down into the vias due to the conical shape of the vias as well as the use of multiple metal ion sources The fifth step will be to deposit an insulating dielectric over the actuator structures. This will be done using electron-beam deposition of a dielectric, such as silicon dioxide, controlled with a shadowmask as described earlier. The end of the traces leading into the vias will be covered by the shadowmask so they are not covered with insulator This completes the fabrication of the polymer backplate.

The device will be assembled in the following manner.

The first step is to adhere the mirror array to the polymer backplate. The standoffs on the polymer backplate will be coated with conductive epoxy. This will both mechanically anchor the mirror array to the polymer backplate as well as connect the electrically active flexure/traces in the mirror array to the corresponding traces on the polymer backplate.

The second step is to heat the steel backing plate attached to the mirror array until the adhesive wax is melted. This releases the mirror array from the steel backing plate. The remaining wax will be chemically stripped off, leaving the mirror array adhered to the polymer backplate.

The third step is to deposit a high-reflection coating on the front of the mirrors. This will be done using RF sputter deposition of the coating such as repeating alternating layers of titanium dioxide and silicon dioxide. The deposition will be controlled with a shadowmask, as described earlier. This will leave a mirror layer only on the main plate of the mirror, avoiding the flexural bearings and anchor standoffs between the mirrored surfaces.

The sixth step will be heat up the steel backing plate on the polymer backplate to melt the wax adhesive. This will allow the steel backing plate to be removed.

The seventh step will be to use ball grid array soldering to wick soldering into the vias in the polymer backplate and connect a PCB to the back of the polymer backplate. This will also seal all of the holes in the polymer backplate.

The eighth step will be to assemble the 10×10 cm mirror array grids into the desired screen size and encase the equipment in a protective enclosure. This enclosure will have a glass plate over the front of the device with anti-reflective coating. Additionally, the mirror array will be hermetically sealed and the air replaced with sulfur dioxide to provide a higher dielectric constant and thus increased actuator performance.

The completed display unit will be calibrated in several steps.

The first step will be to tune groups of mirrors to perform in a similar manner so they may be controlled in bulk. It is desired that groups on the scale of 10×10 mirrors, each a millimeter across will be controlled with one signal. This means roughly 1×1 cm sections of the display will be controlled in bulk. This will be done by shining a laser on the section, then optically determining the angle of each of the mirrors when actuator by the same signal. Resistors on the PCB will be laser etched to tune these mirrors to all provide the same angle for the same actuation command. This will be repeated for all 4 actuators in the bulk area.

The second step will be to calibrate the bulk controlled mirrors. Lasers and optical sensors will again be used to determine the unique four actuator values required to achieve particular angle coordinates. This will be repeated for coordinates spanning the full 2D range of operation. This process will be automated to scan through the values in a few seconds. Non-linear fits will be applied to this data to produce calibration curves describing the four actuator values required for any given tip and tilt.

This will produce a television set capable of full operation. Should the television lose its calibration in the field, it may be quickly recalibrated by holding up an optical sensor in front of the display, within the viewing zone. The mirrors will then each be scanned until they are reflecting an image (white screen) from the projector to the sensor, which can pick up this signal when the mirrors are correctly angled. The eye locating cameras will calculate the location of the optical sensor in front of the tv. This will be used to calculate the angle required for each bulk set of mirrors to reflect to the sensor. This known angle may be combined with the commanded actuation voltage to produce data point for recalibrating the mirrors. A thorough recalibration may be done by holding the optical sensor in a few different locations over the full viewing area of the display. Once the display has gotten every bulk mirror section to focus the projector light onto the sensor, then the sensor may be moved to a new location. This should take a few seconds per location to calibrate. The new data points may be used to re-calculate the calibration of the mirrors, removing any creep or drift accumulating in the device.

Figure 7:
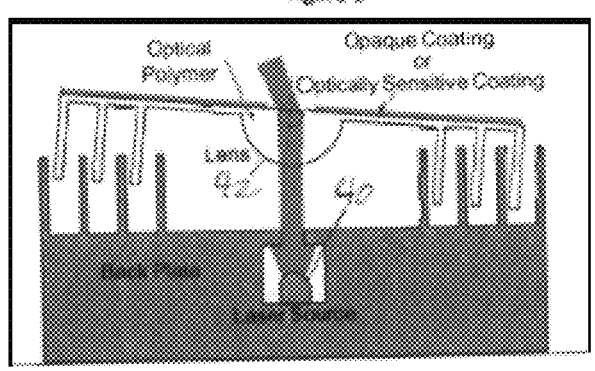
FIG. 7 is a side view of an internal source ADL display system utilizing built in laser light sources for each pixel.

The previous design has focused on utilizing an external projector to generate the images required for 3D viewing. In an alternate embodiment shown in FIG. 7, the image is generated by small light sources located on the screen itself. These could be a set of primary color lasers 40 located behind each pixel. The tip and tilt of the millimeter stage may be used to deflect the laser in the desired direction by placing a small lens 42 in the center of the stage with the convex surface facing downwards towards the lasers. The lens 42 would be fabricated as a feature in the middle of the stage by making the entire stage out of an optical grade polymer. This would avoid assembly issues, as the lens would be built into the stage structure. The lens 42 and internal source based device would produce the same effect as the previous embodiment, without requiring the use of an external projector. The maximum angular deflection of the laser 40 light could be adjusted by changing the geometry of the lens 42, thus allowing for larger viewing areas. The majority of the surface of the stage would be covered with an opaque film to prevent light passing through anywhere but the lens 42 at the center of the stage.

The internal source embodiment described above could also be utilized as a simultaneous image capture and projection system. If the opaque surface film were instead replaced with a directional optically sensitive film, the device would be able to capture images while simultaneously displaying them. Alternately, an optical sensor placed next to the laser emitter would be able to capture light passing back through the lens-recording the optical flux from only the direction the stage is pointing. The simultaneous image capture and projection properties of this device would enable it to mimic the light passing through a given volume. A sphere assembled from internal source ADL display screens would be capable of measuring the light impinging on the sphere from all directions, and projecting that same light on the other side of the sphere, as if the sphere were not blocking the light. This would have the effect of rendering the sphere, and everything within it, effectively invisible. The information gathered by the spherical display would enable observers within the sphere to see outside in all directions.

The importance of the design disclosed herein lies in its ability to control both images and the location at which the images are viewable, all at a high rate. It is possible to provide unique video feeds to each viewer as well as perspective images to each eye of the viewers. This performance cannot be achieved using any other display at present.

The performance offered by the display disclosed herein has applications in fields such as entertainment, advertising, business, military, computer aided design, research, and medicine. The entertainment industry could use the display disclosed herein for 3-D movie theatres, 3-D home televisions, and multi-viewer displays for gaming consoles (Wii, PlayStation, etc.) wherein each gamer is able to view the full screen without having to divide it into different viewpoints as is presently done. Internal source displays could be used in portable equipment such as laptops and mobile phones. A simultaneous 3D image capture on the back of these devices would enable the device screen to project the captured image in a 'virtual transparency' mode, effectively seeing through the device, while 3D information could be overlaid on the captured image. This would allow for practical augmented reality for such uses as navigation, social interaction, accessing product information and situational awareness for military personnel in combat. Public screens (in airplanes, buses, etc.) could simultaneously display 3-D videos on the same screen that are unique for each viewer. The advertising industry can use the display of the present invention to provide both 3-D advertising in public areas and stores. This advertising can be customized to the viewer using the multithreaded ability of the display meaning that age or gender targeted ads can be displayed to viewers that fit the selected categories. A customized display may be projected to customers who choose to identify themselves and be known to the store with tags such as RFID. The information for the customer can include the location of their favorite items, any new items of interest, and targeted advertisements. Businesses can use the display disclosed herein for 3-D presentations and private viewing of sensitive information on ATM screens or public video conferencing. The military can use this display technology to capture 3-D images for reconnaissance and display these images so that groups can see depth details in the images. Designers and researchers can use the ADL display to visualize complex 3-D shapes found in computer aided design work or in nature. The medical field can use this display so that multiple viewers can watch robotic surgery or study 3-D body scans. The multiviewer capability of the screen will allow assistants or other specialists to observe the surgery without the need to take on/off glasses when other tasks must be done in the sterile surgical room.

It is recognized that modifications and variations of the invention may be apparent to those of ordinary skill in the art and it is intended that all such modifications and variations be included within the scope of the appended claims.

What is claimed is:

1. Autostereoscopic display comprising:
    an array of elements, the elements being mirrors, from which light emanates, the array forming a curved surface with element edges tilted inward, the elements being indendently rotatable about two orthogonal axes by microcontrollers; and
    an eye tracker for determining the location in three dimensions of at least one eye viewing the array;
    wherein the microcontrollers, using information from the eye tracker, rotate the independently rotatable elements so that the array mimics a concave surface to deliver light to the eye.

2. The display of claim 1 wherein the elements are mirrors and further including a projector for projecting an image on the array for reflection to the eye.

3. The display of claim 1 wherein the elements include a laser light or light-emitting diode to generate light and a lens for directing light to the eye.

4. The display of claim 1 wherein the eye tracker includes two eye-locating cameras.

5. The display of claim 1 wherein the elements are anchored to a support structure with flexures.

6. The display of claim 5 wherein the elements are rotated by electrostatic actuators.

7. The display of claim 1 wherein separate images are delivered to eyes of different viewers.

8. The display of claim 1 wherein separate images are delivered sequentially to each eye of a single viewer.

9. The display of claim 1 wherein the elements in the array are in the size range of 0.2 mm to 10 mm.

* * * * *